United States Patent [19]
Elkhoury

[11] Patent Number: 5,809,534
[45] Date of Patent: Sep. 15, 1998

[54] PERFORMING A WRITE CYCLE TO MEMORY IN A MULTI-PROCESSOR SYSTEM

[75] Inventor: Bassam N. Elkhoury, Longmont, Colo.

[73] Assignee: Compaq Computer Corporation, Houston, Tex.

[21] Appl. No.: 662,491

[22] Filed: Jun. 13, 1996

[51] Int. Cl.[6] .................................................. G06F 12/00
[52] U.S. Cl. ........................ 711/142; 711/220; 711/217; 711/211; 711/143
[58] Field of Search ................................ 395/411, 473, 395/182.03, 479, 250, 461, 460, 470

[56] References Cited

U.S. PATENT DOCUMENTS

| | | | |
|---|---|---|---|
| 4,298,929 | 11/1981 | Capozzi | 395/411 |
| 5,341,487 | 8/1994 | Derwin et al. | 395/473 |
| 5,347,648 | 9/1994 | Stamm et al. | 395/182.03 |
| 5,404,489 | 4/1995 | Woods et al. | 395/479 |
| 5,459,842 | 10/1995 | Begun et al. | 395/250 |
| 5,463,759 | 10/1995 | Ghosh et al. | 395/461 |
| 5,469,555 | 11/1995 | Ghosh et al. | 395/460 |
| 5,553,265 | 9/1996 | Abato et al. | 395/470 |
| 5,627,993 | 5/1997 | Abato et al. | 395/470 |

OTHER PUBLICATIONS

Compaq Computer ProLiant 2000, "QuickSpecs", Product Buletin, Doc. No. 041C/0595 (May 1995).
Compaq Computer ProLiant 4000, "QuickSpecs", Product Buletin, Doc. No. 043C/0595 (May 1995).

*Primary Examiner*—Tod R. Swann
*Assistant Examiner*—Fred Fei Tzeng
*Attorney, Agent, or Firm*—Fish & Richardson P.C.

[57] ABSTRACT

In a method and system of performing a write cycle to a memory address in a multi-processor system, a first write cycle is initiated to the memory address, and a second write cycle is initiated to the memory address. Data from the first and second write cycles is merged, and the merged data is written to the memory address.

19 Claims, 5 Drawing Sheets

5,809,534

PERFORMING A WRITE CYCLE TO MEMORY IN A MULTI-PROCESSOR SYSTEM

CROSS REFERENCE TO RELATED APPLICATION

This application is related to U.S. patent application Ser. Nos. 08/662,479 and 08/662,480, both of which were filed on Jun. 13, 1996 and are assigned to the assignee of the present application.

BACKGROUND OF THE INVENTION

The present invention relates to performing a write cycle to memory in a multi-processor system.

Many computer systems include multiple processors, such as central processing units (CPUs), which may perform various operations requiring access to a main memory. Examples include reading or writing data from or to the main memory. In these systems, several CPUs may perform operations with respect to data stored in a particular main memory address during the same time interval. Furthermore, a particular CPU may retrieve data from the main memory, modify the retrieved data, and then write the modified data to the specified main memory address.

To enhance the speed capabilities of the system, many computer systems have cache memories associated with the CPUs in addition to the system's main memory. The cache memories are used for the temporary storage of data which the CPUs use during performance of various other operations.

Data is typically transferred between the main memory and the CPUs through one or more buses. A central processor controls access to the bus and determines which CPU or other system component will be given access to the bus at any given time. The central processor thus allows certain cycles involving main memory to be performed before performance of other cycles involving data storage or data retrieval to or from memory. One purpose of such priority techniques is to ensure that data stored in the main memory does not become stale. These priority techniques thus help prevent one system component from accessing data in the main memory which was previously modified by another system component but which has not yet returned to the main memory.

SUMMARY OF THE INVENTION

In general, in one aspect, the invention features performing a write cycle to a memory address in a multi-processor system. A first write cycle is initiated to the memory address, and a second write cycle is also initiated to the memory address. Data from the first and second write cycles is merged, and the merged data is written to the memory address.

Certain implementations of the invention include one or more of the following features. Merging data from the first and second write cycles may include writing over data from the second write cycle with data from the first write cycle. Valid data from the first write cycle may be latched, and valid data from the second write cycle may be latched with the exception of data from the second write cycle which corresponds to the latched data from the first write cycle. The first write cycle may include a write through cycle to a main memory. At least one multiplexer may be provided for merging data from the write cycles.

In response to initiating the first write cycle, it may be determined whether any of specified cache memories in the system are in a state requiring that data stored in the cache memories be written to the main memory prior to or concurrently with the data from the first write cycle. Also, in response to initiating the first write cycle, it may be determined whether any cache memories in the system are in a modified state with respect to the memory address. A snoop routine may be performed with respect to the memory address, and the second write cycle may include a write back cycle performed as a result of the snoop routine. The first write cycle may be a write through cycle initiated to the memory address, and the second write cycle may be a write back cycle initiated to the same memory address in a cache line. The first write cycle may be initiated by a first processor and the second write cycle may be initiated by a second processor. Alternatively, the write through cycle may be initiated by an I/O device in a single or multi-processor system.

Certain implementations of the invention provide one or more of the following advantages. By merging the data from multiple write cycles to a particular memory address, the first processor need not reacquire control of the bus. As a result, the first processor need not perform a further write cycle once it reacquires the bus. A reduction in the time required to perform certain write operations may thus be achieved.

Other features and advantages of the invention will be more clearly understood upon reading the following description and accompanying drawings and the claims.

DESCRIPTION OF THE PREFERRED EMBODIMENTS

Figure 1:
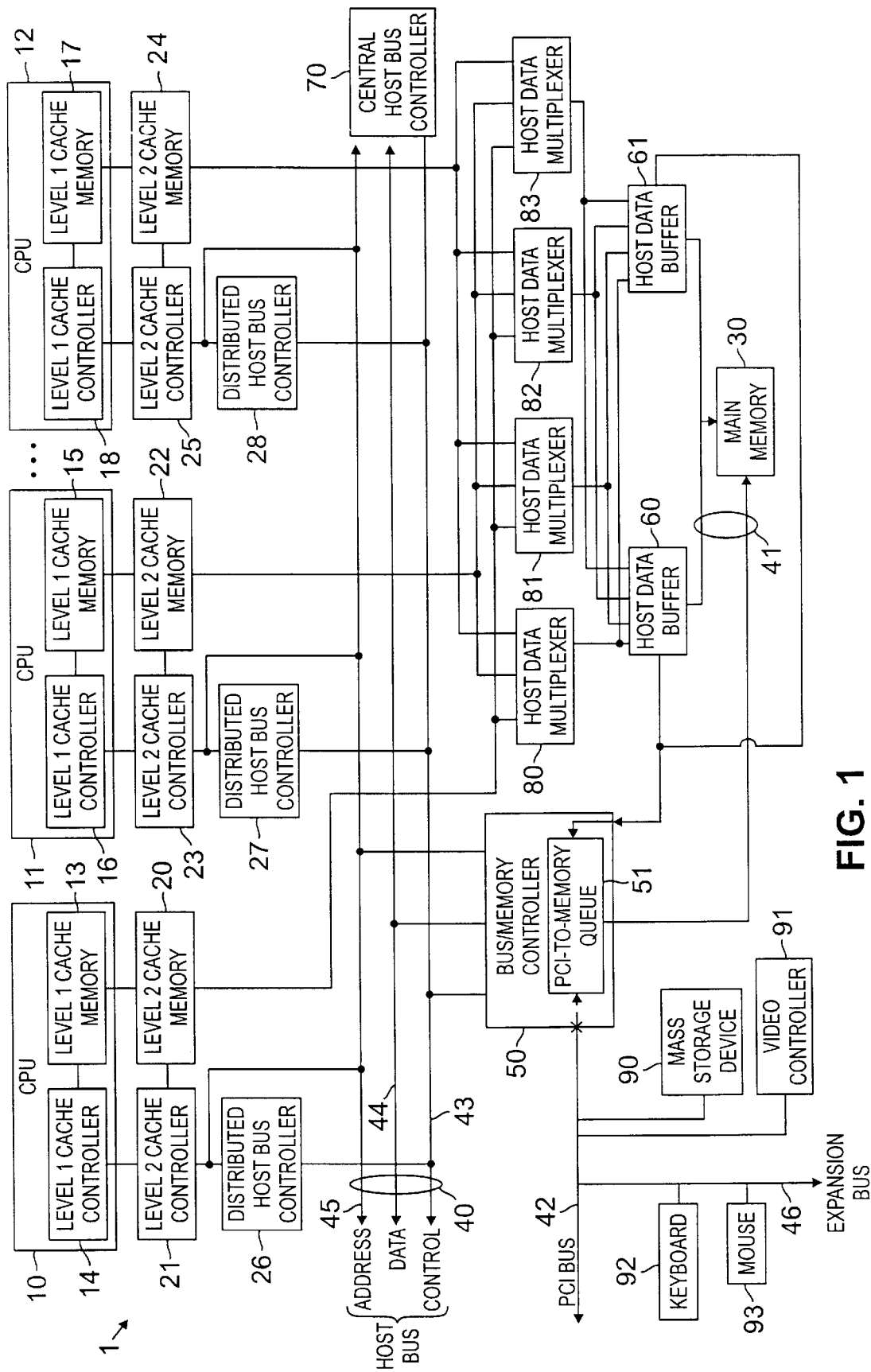
FIG. 1 is a block diagram of a multi-processor system.

In FIG. 1, each functional block of a multi-processor system 1 may be implemented, for example, as an integrated chip. The system 1 includes multiple data, address and control buses, including a host bus 40, a memory bus 41 and a peripheral control interface (PCI) bus 42. The host bus 40 includes address, data and control lines 43, 44, 45, respectively.

The system 1 also includes a mass storage device 90, such as a hard disk controller, and a video controller 91 including a display unit, connected to the PCI bus 42. In addition, an expansion bus 46 is connected to the PCI bus 42. Peripheral devices, such as a keyboard 92 and a mouse 93, are connected to the expansion bus 46.

A bus and memory controller 50 is used in conjunction with a pair of host data buffers 60, 61 to control the flow of data among the various buses in the system. The bus and memory controller 50 includes a PCI-to-memory queue 51 which is a content addressable memory and which handles PCI write operations and PCI read operations to and from a main memory 30, respectively. The host data buffers 60, 61 serve as a processor-to-memory queue for data flowing from processors, such as CPUs 10, 11, 12, through host data multiplexers 80, 81, 82, 83, to the main memory 30. The host data buffers 60, 61 perform data ordering for read and write cycles. The host data buffers 60, 61 also allow data to flow between the CPUs 10, 11, 12 and the PCI-to-memory queue 51 in the bus and memory controller 50.

As further shown in FIG. 1, a first level cache memory for storing data and a first level cache controller for storing the flow of data into and out of the first level cache memory is associated with each of the CPUs 10, 11, 12. Thus, for example, the CPU 10 has a cache memory 13 and a cache controller 14. The CPUs 11, 12 also have cache memories 15, 17 and cache controllers 16, 18, respectively. A second level cache memory and second level cache controller is also associated with each of the respective CPUs 10, 11, 12. Thus, for example, the CPU 10 has a second level cache memory 20 and a second level cache controller 21. Similarly, the CPUs 11, 12 have second level cache memories 22, 24 and second level cache controllers 23, 25, respectively. Data stored in one of the first level cache memories 13, 15, 17 can be transferred to the associated second level cache memory 20, 22 or 24. The cache memories may suitably be implemented, for example, using SRAMs.

The CPUs 10, 11, 12 are capable of performing various read or write operations, including write back and write through operations. When a write through operation is performed, for example, data is written directly to the main memory 30 as well as to the associated level two cache memory. In contrast, a cache which is following a write back protocol does not write the data to the main memory until a write back instruction is received.

The caches are divided into lines, each of which is associated with one or more main memory addresses. The system 1 is constructed to allow a cache to occupy one of four states with respect to a cache line. First, the cache may be in an invalid state with respect to a cache line. The invalid state indicates that there is no valid data currently stored in the cache with respect to the memory addresses associated with that cache line. Second, the cache may be in a modified state with respect to the cache line, indicating that only the CPU associated with that cache has retrieved and modified data from any of the main memory addresses associated with the cache line. Third, the cache may be in an exclusive state with respect to the cache line, indicating that only the CPU associated with that cache has retrieved data stored in any of the memory addresses associated with the cache line and that the data has not been modified by that CPU. Fourth, the cache may be in a shared state with respect to the cache line, indicating that more than one of the CPUs 10, 11, 12 has retrieved data stored in any of the memory addresses associated with the cache line and that the data currently stored in the cache memories associated with those CPUs is the same. Each of the memory addresses associated with a particular cache line occupies the same state as that cache line.

Logic that resides between the level two cache controllers 21, 23, 25 and the bus and memory controller 50 is split into two sections, a central host bus controller 70 and respective distributed host bus controllers 26, 27, 28. Thus, each of the CPUs 10, 11, 12 has a distributed host bus controller 26, 27 or 28 associated with it.

Each distributed host bus controller 26, 27, 28 functions as an interpreter between its respective level two cache controller 21, 23, 25 and the bus and memory controller 50. The distributed controllers 26, 27, 28 drive various cache controller signals to configure the logical and physical attributes of the respective caches, including, for example, line size, cache size, and data bus width. The distributed controllers 21, 23, 25 also request access to the host bus 40 for various cache controller cycles. Once a specific distributed controller receives access to the host bus 40, it drives the signals on the host address and control lines 43, 45. The distributed controllers 26, 27, 28 perform additional functions as described in greater detail below.

The central host bus controller 70 determines which of the various components of the system 1 will be given access to the host bus 40 during specified time intervals. In particular, the central host bus controller 70 arbitrates between competing requests for access to the host bus 40, according to the principles discussed further below.

Figure 2:
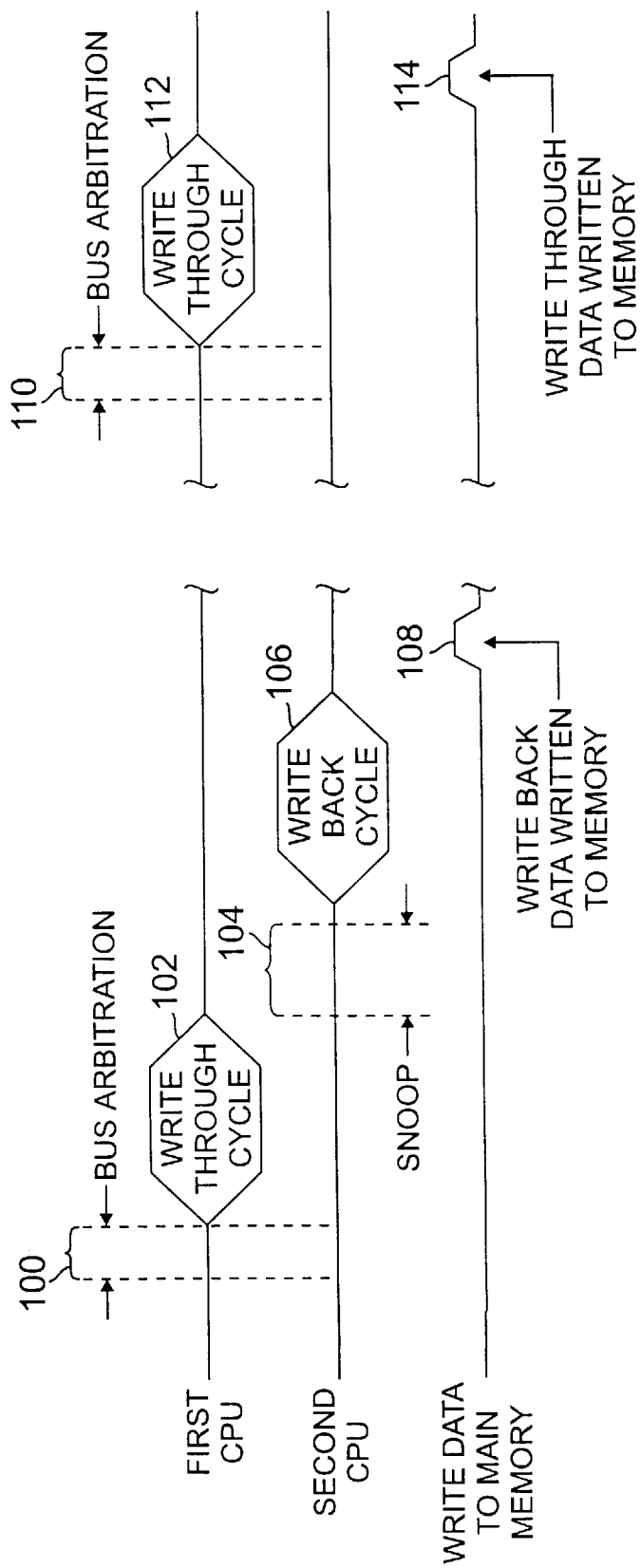
FIG. 2 is a timing diagram of signals in a write cycle to memory according to one known technique.

Before discussing the invention further, it is useful to explain how one known system functions to perform a write cycle to a memory address in a multi-processor system. FIG. 2 illustrates a timing diagram for signals occurring during an exemplary write through operation according to one known technique. A first CPU initiates a write through operation by requesting access to a host bus. During a subsequent bus arbitration time interval 100, the central controller 70 grants the first CPU access to the host bus. The first CPU then begins its write through cycle, indicated by 102, during which it asserts a particular address in the main memory to which the data is to be written.

Before the data from the first CPU is written to the main memory, however, a snoop routine is performed to determine whether any other CPU has modified data previously stored in the particular main memory address. During performance of the snoop routine, other CPUs, such as a second CPU, continuously snoop or watch for the address which the first CPU is attempting to access. In other words, each of the other CPUs continuously watches for an indication that the first CPU is attempting to access a memory address. When the other CPUs detect an attempt by the first CPU to access a particular memory address, each of the other CPUs responds by generating a signal, which may be referred to as a snoop response, indicative of the state which its associated cache memory occupies with respect to the particular memory address. A central controller receives the snoop responses and determines whether any of the snoop responses indicates that a cache memory associated with one of the CPUs occupies a modified state with respect to the memory address to be accessed. Performance of the snoop routine is indicated by the time interval 104 in FIG. 2.

If the central controller determines, for example, that the snoop response from the second CPU indicates that the associated cache memory is in a modified state with respect to the memory address to be accessed by the first CPU, then the central processor interrupts and terminates the first CPU's write through cycle and grants access to the host bus to the second CPU. The second CPU then performs a write back cycle 106, and the modified data from the second CPU is written to the particular address in the main memory, as indicated by 108.

Writing the previously modified data from the second CPU prior to writing data from the first CPU helps ensure that the data stored in the main memory is current. According to this known technique, however, the first CPU must once again request access to the host bus to write through its data to the main memory. Thus, a new bus arbitration period 110 occurs during which the central processor again grants the first CPU access to the host bus. Only during a subsequent time interval 114 is the data from the first CPU written through to the particular main memory address.

Figure 3:
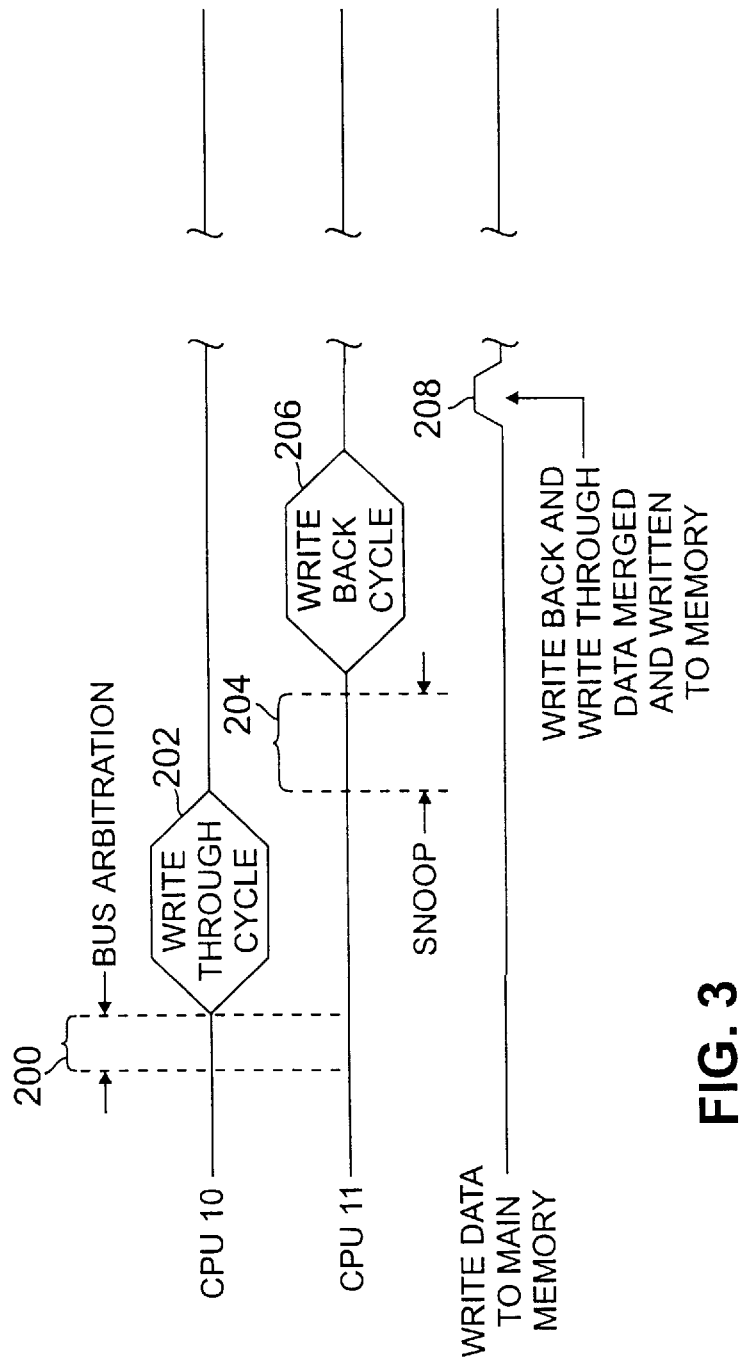
FIG. 3 is a timing diagram of signals in a write cycle to memory according to the present invention.
Figure 4:
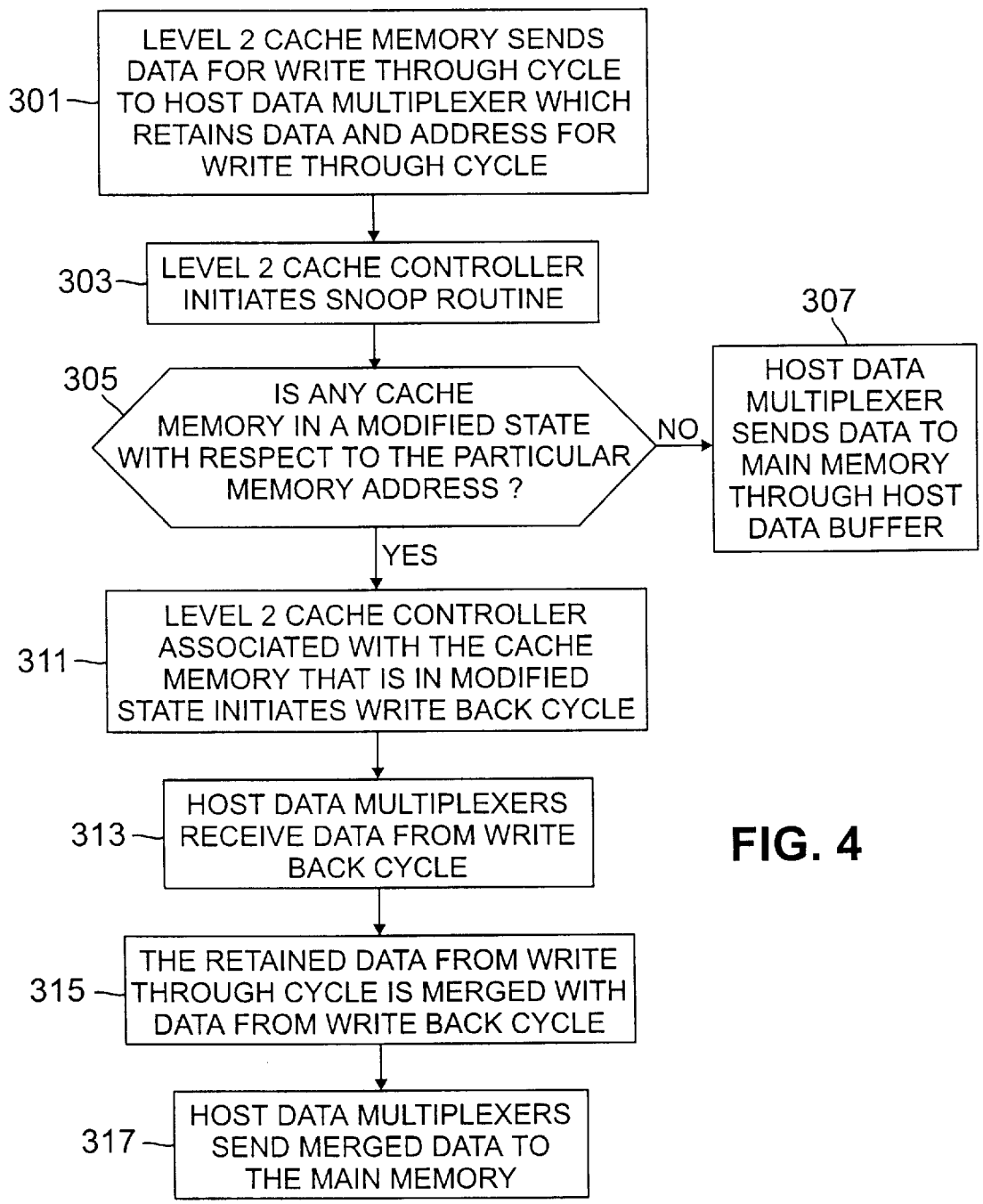
FIG. 4 is a flow chart of a method of performing a write cycle to memory according to the present invention.
Figure 5:
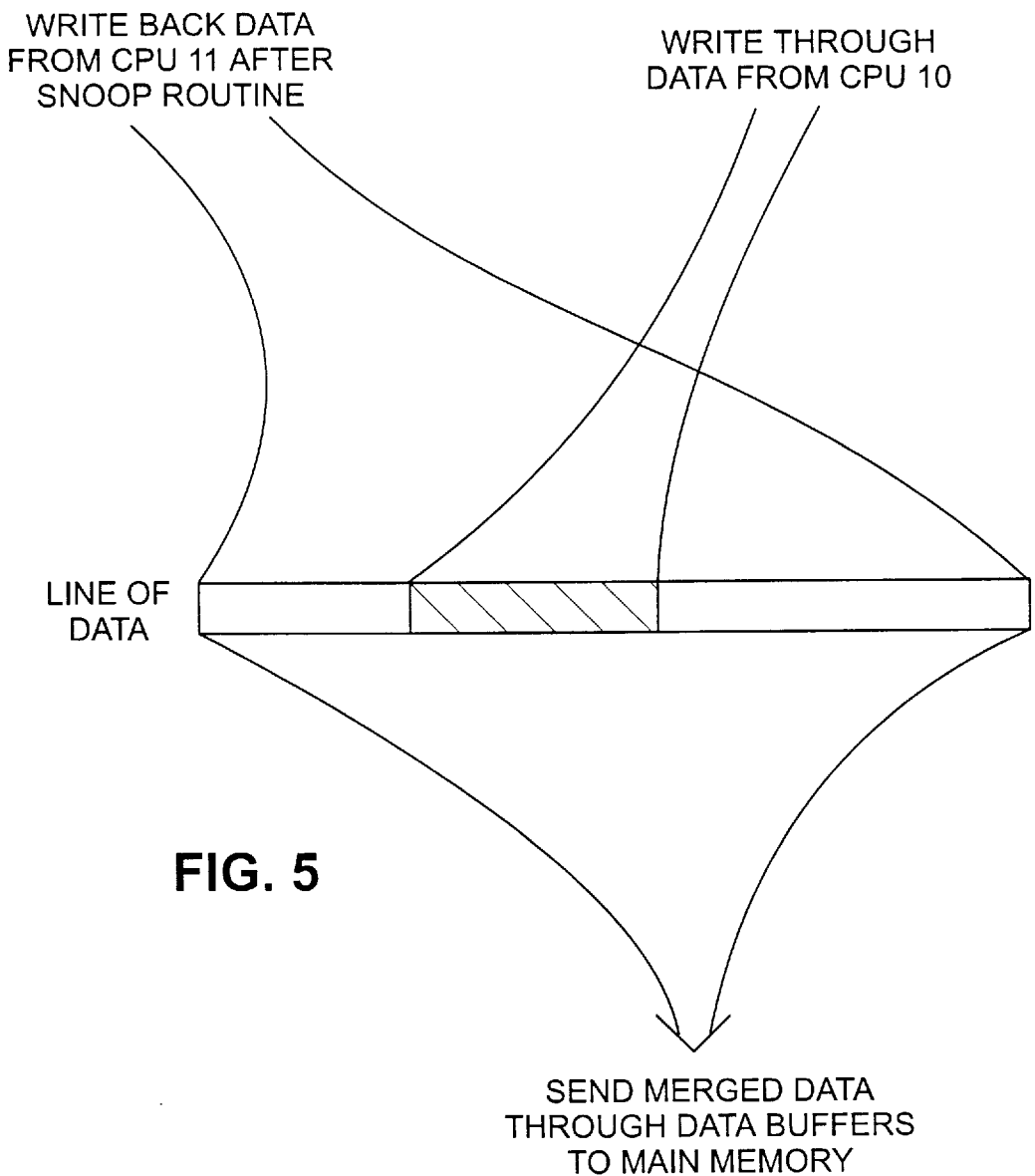
FIG. 5 illustrates the merging of data from two write cycles.

FIGS. 3–5 illustrate a method of performing a write through operation to the main memory 30 according to the present invention. One of the CPUs in the system 1, the CPU 10 for example, may initiate a write through operation by requesting access to the host bus 40. Alternatively, the write through cycle may be initiated by an input/output (I/O) device, such as a peripheral bus master or the mass storage device 90, transferring data to the main memory 30. Assuming, for example, that the write through cycle is initiated by the CPU 10, a bus arbitration period occurs, indicated by 200 in FIG. 3, during which the central host bus controller 70 grants the CPU 10 access to the host bus 40. The CPU 10 then begins its write through cycle. With reference to FIG. 4, the write through data, which in the particular implementation being described is at most eight bytes, is sent from the cache memory 20 to one of the host data multiplexers, such as the multiplexer 80, as indicated by step 301. Control signals are provided to indicate which of the eight bytes contain valid data. The multiplexer 80 receiving the write through data latches and retains the valid write through data for use as explained further below.

As indicated by step 303, the cache controller 21 associated with the CPU 10 initiates a snoop routine with respect to the main memory address to which the write through data is to be written. A suitable snoop routine is described in the aforementioned U.S. patent application Ser. No. 08/662,479.

The snoop routine is performed during the time interval 204 in FIG. 3. In general, the snoop routine determines whether data from the particular main memory address was modified previously by one of the CPUs in the system 1 but has not yet returned to the main memory 30. For this purpose, a snoop request signal, indicating that the CPU 10 has initiated a write through operation to a specified memory address in the main memory 30, is sent from the distributed controller 26 to the central controller 70. The central controller 70 forwards the snoop request signal to the other distributed controllers 27, 28, which instruct the associated cache controllers 23, 25 to determine what state each of the associated cache memories 22, 24 occupies with respect to the specified main memory address. First, however, any data stored in the first level cache memories 15, 17 and associated with the specified memory address is transferred to the respective second level cache memory 22 or 24. The snoop request signals are transmitted between the distributed controllers and the central controller 70 by dedicated connections, such as the control line 43 in FIG. 1.

In response to the snoop request, each of the level two cache controllers 23, 25 associated with the remaining CPUs 11, 12 generates a snoop response indicating the state occupied by its associated cache memory 22, 24 with respect to the cache line associated with the specified memory address.

The central controller 70 monitors the snoop responses as they are received to determine whether a snoop response indicates that a cache memory is in a modified state with respect to the particular memory address, as indicated by step 305 in FIG. 4. If none of the snoop responses indicates that a cache memory is in a modified state with respect to the particular memory address, then, as shown by step 307, the central controller 70 instructs the host data multiplexer 80 to write the previously retained data to the main memory 30 through one of the host data buffers 60, 61. In the particular implementations being described, if a monitored snoop response indicates that one of the cache memories is in either a shared or an exclusive state with respect to the particular memory address, then the central controller 70 terminates the snoop routine and instructs the host data multiplexer 80 to write the previously retained data to the main memory 30.

If, on the other hand, a received snoop response indicates that a cache memory is in a modified state with respect to the particular memory address, then the level two cache controller associated with that cache memory initiates a write back operation, as indicated by step 311. The purpose of this write back operation, by which the modified data currently stored in one of the cache memories is directed to the main memory 30, is to ensure that the data stored in the main memory 30 is not stale and that data used by the various components of the system 1 is consistent.

Assuming, for example, that data, which is stored in a cache line of the CPU 22 and is associated with the particular memory address, has been modified by the CPU 11, then the cache controller 23 associated with the CPU 11 would initiate the write back cycle to the main memory 30. This write back cycle is shown as 206 in the timing diagram of FIG. 3. The central controller 70 then grants control of the host bus 40 to the cache controller 23 to complete its write back cycle. In the particular implementation being described, the write back data may contain up to thirty-two bytes of data. As indicated by step 313, the write back data stored in the cache line which occupies the modified state is sent to and received by the multiplexers 80–83.

Next, as indicated by step 315, the multiplexer 80, which had previously latched and retained the write through data from the cache memory 20, receives control signals instructing it to write over a portion of the write back data received from the cache memory 22 with the corresponding valid write through data previously received from the cache 20. In other words, each valid byte of write back data is latched by the multiplexers 80–83 with the exception of the bytes of write back data corresponding to the previously latched write through data. The effect of step 315 is to allow the write through data and write back data to be merged so that the merged data may be written to the main memory 30 in a single step. The merging of the write back data from the CPU 11 after the snoop sequence with the write through data from the CPU 10 is illustrated in FIG. 5. Finally, in step 317, the multiplexers 80–83 send the merged data to the data buffers 60, 61 which transfer the merged data to the main memory, as indicated by the interval 208 in FIG. 3.

A comparison of the timing diagrams of FIGS. 2 and 3 illustrates how the invention reduces the number of cycles required for certain write through operations. In particular, when one cache contains data which must be written to memory prior to data associated with the write through cycle, the write through data is retained by the host data multiplexer 80 so that a complete interruption of the write through cycle is not required. The CPU initiating the write through operation need not request access to the host bus 40 a second time or perform a second write through cycle. The invention thus achieves a reduction in the time required to perform certain write through operations to memory.

Other implementations are within the scope of the following claims.

What is claimed is:

1. A method of writing data to a memory address in a multi-processor system, comprising:
   initiating a first write cycle to the memory address;
   initiating a second write cycle to the memory address, wherein each of the first and second write cycles is to at least a portion of the memory address and wherein there is at least a partial overlap between the portions;
   merging data from the first and second write cycles; and
   writing the merged data to the memory address.

2. The method of claim 1 wherein merging comprises writing over data from the second write cycle with data from the first write cycle.

3. The method of claim 1 wherein merging comprises:

latching valid data from the first write cycle; and latching valid data from the second write cycle with the exception of data from the second write cycle which corresponds to the latched data from the first write cycle.

4. The method of claim 1 wherein the first write cycle comprises a write through cycle to a main memory.

5. The method of claim 4 further comprising determining, in response to initiating the first write cycle, whether any of specified cache memories in the system is in a state requiring that data stored in the cache memories be written to the main memory prior to or concurrently with the data from the first write cycle.

6. The method of claim 5 wherein the step of determining comprises performing a snoop routine with respect to the memory address.

7. The method of claim 1 wherein the second write cycle is a write back cycle performed as a result of a snoop routine.

8. The method of claim 7 further comprising determining, in response to the step of initiating the first write cycle, whether any cache memories in the system is in a modified state with respect to the memory address.

9. The method of claim 1 wherein the first write cycle is initiated by a first processor, and the second write cycle is initiated by a second processor.

10. The method of claim 1 wherein the first write cycle is initiated by an input/output device, and the second write cycle is initiated by a processor.

11. The method of claim 1 wherein the first write cycle is a write through cycle initiated to the memory address, and the second write cycle is a write back cycle initiated to the memory address in a cache line.

12. A multi-processor system for writing data to memory comprising:

a main memory;

a plurality of processors each of which can initiate write cycles to main memory;

at least one bus for transferring data from the processors to the main memory;

a central controller for controlling access to the bus; and at least one multiplexer for merging data from a plurality of write cycles to a main memory address prior to sending the data to the main memory, wherein each of the write cycles is to at least a portion of the main memory address and wherein there is at least a partial overlap between the portions.

13. The system of claim 12 wherein the multiplexer latches valid data from a first write cycle and valid data from a second write cycle with the exception of data from the second write cycle which corresponds to the latched data from the first write cycle.

14. The system of claim 12 wherein the multiplexer latches valid data from a first write cycle and valid data from a second write cycle with the exception of data from the second write cycle which corresponds to previously latched data from the first write cycle.

15. The system of claim 12 wherein the processors are capable of initiating write through cycles to the main memory and write back cycles to the main memory, and wherein the multiplexer retains data from a write through cycle until data from a write back cycle is received and merged with the data from the write through cycle.

16. The system of claim 15 wherein the central controller is programmed to monitor, following initiation of a write through cycle by one of the processors, whether any cache memory associated with the processors is in a state requiring that data stored in one of the cache memories be written to the main memory prior to or concurrently with the data from the write through cycle.

17. The system of claim 16 wherein the write back cycle is initiated in response to a determination by the central controller that one of the cache memories is in a modified state with respect to a memory address associated with the write through cycle data.

18. A system for writing data to memory comprising:

a main memory;

at least one processor and at least one input/output device each of which can initiate write cycles to main memory;

at least one bus for transferring data from the processors and input/output devices to the main memory;

a central controller for controlling access to the bus; and at least one multiplexer for merging data from a plurality of write cycles to a main memory address prior to sending the data to the main memory, wherein each of the write cycles is to at least a portion of the main memory address and wherein there is at least a partial overlap between the portions.

19. The system of claim 18 wherein the at least one input/output device is capable of initiating write through cycles to the main memory, wherein the at least one processor is capable of initiating write back cycles to the main memory, and wherein the at least one multiplexer retains data from a write through cycle until data from a write back cycle is received and merged with the data from the write through cycle.

* * * * *